[11] 3,631,786

[72] Inventor Arthur H. Crapsey, Jr.
  Rochester, N.Y.
[21] Appl. No. 57,661
[22] Filed July 23, 1970
[45] Patented Jan. 4, 1972
[73] Assignee Eastman Kodak Company
  Rochester, N.Y.

[54] ADJUSTING MECHANISM FOR ZOOM LENS SYSTEM
  9 Claims, 3 Drawing Figs.
[52] U.S. Cl................................................ 95/45,
  350/42, 350/184, 350/187, 352/140, 355/58
[51] Int. Cl................................................. G03b 3/00
[50] Field of Search................................................ 95/45;
  350/42, 184, 187; 352/140; 355/58

[56] References Cited
  UNITED STATES PATENTS
  1,645,367  10/1927  August........................ 355/58
  3,246,590  4/1966   Jenkins......................... 95/45
  3,438,689  4/1969   Wehr............................ 350/42
  3,415,592  12/1968  Price............................ 350/184

*Primary Examiner*—Samuel S. Matthews
*Assistant Examiner*—Richard A. Wintercorn
*Attorneys*—Robert W. Hampton and Milton S. Sales ABSTRACT: A motion picture camera includes a taking lens system having a zooming component and a compensating component which are movable in opposite linear directions for varying the magnification of the system. These components are carried by lens mounts attached to sleeves slidably mounted on rods. Each sleeve carries a pin which is inserted in slots in opposite ends of a linking lever. That lever is pivoted in a camera housing about a point intermediate its ends. One of the sleeves is also attached to the end of a second lever by a pin-in-slot arrangement. The second lever is pivotally mounted in the housing intermediate its ends, and the other end of the second lever is flexibly attached to a slide which is linearly movable along a path perpendicular to the axis of rotation of the second lever and spaced therefrom. A manually operable zooming knob is connected to the slide via a cam, whereby rotation of the zooming knob moves the slide and thereby the zooming elements. The knob is rotatable through 360°, and detents are provided in the cam surface to indicate maximum wide angle and maximum telephoto positions.

PATENTED JAN 4 1972
3,631,786
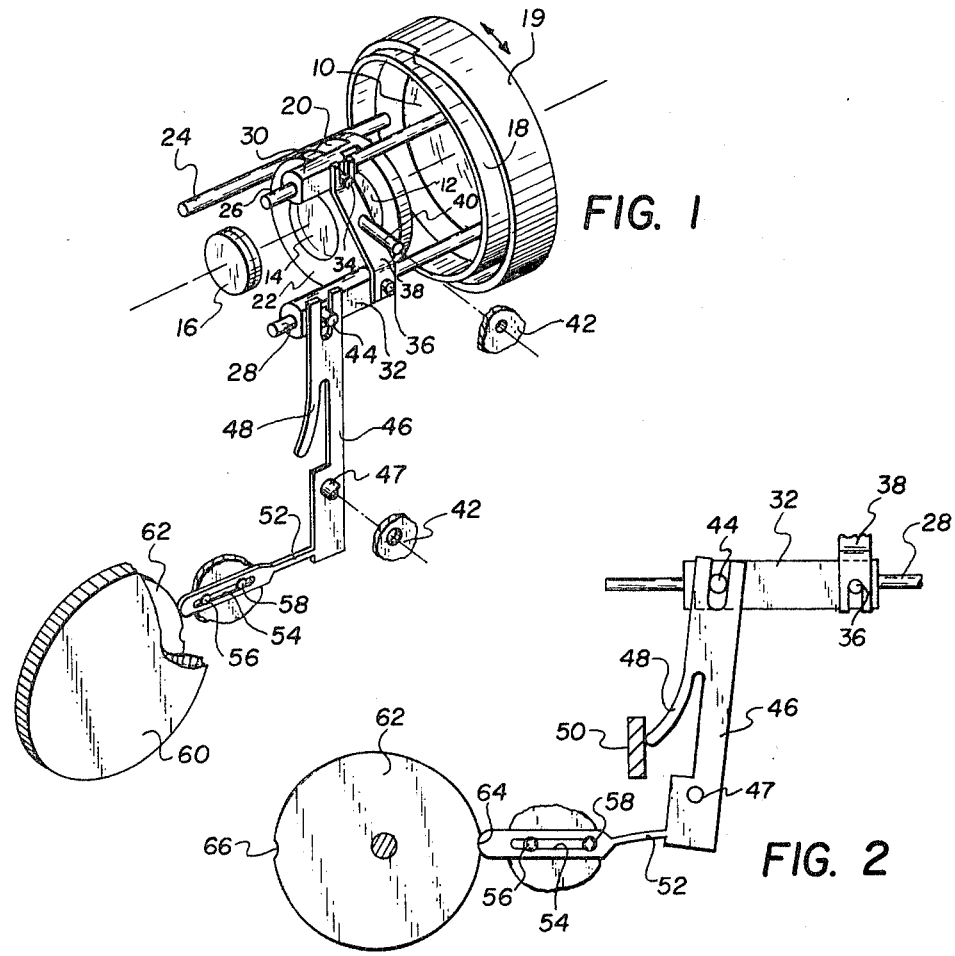
FIG. 1
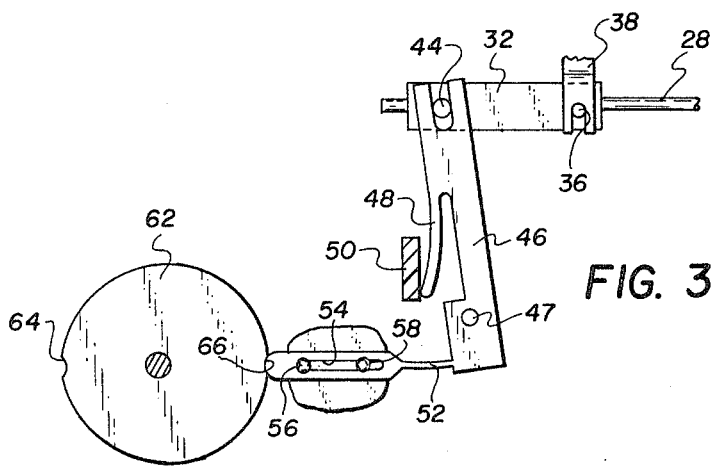
FIG. 2
FIG. 3
ARTHUR H. CRAPSEY
INVENTOR.
BY Milton S. Sales
Robert W. Hampton
ATTORNEYS 3,631,786

ADJUSTING MECHANISM FOR ZOOM LENS SYSTEM

BACKGROUND OF THE INVENTION

1. Field of the Invention

The present invention relates to motion picture cameras wherein the lens system thereof includes a zoom portion, and more particularly to a mechanism for effecting movement in either axial direction of at least one component of the zoom portion of the taking lens system.

2. Description of the Prior Art

It is known to interconnect zoom lenses having a pair of axially and oppositely movable components by a linking lever pivotally mounted in a camera intermediate its connections to the lens components. Such an arrangement is shown in coassigned U.S. Pat. No. 3,415,592 in the name of W. H. Price, issued Dec. 10, 1968.

Coassigned U.S. Pat. No. 3,438,689 to C. W. Wehr, issued Apr. 15, 1969, shows a zoom telescopic finder in which one of the lens components is axially moved by a lever which is attached to the lens mount at one of its ends by a pin-in-slot arrangement. The lever is pivotally mounted to the camera intermediate its ends and the other end of the lever is attached to a slide member by another pin-in-slot connection.

SUMMARY OF THE INVENTION

An object of the present invention is to provide a simple, low cost mechanism for adjusting a taking lens system of a camera which includes at least one axially movable lens component for varying the magnification of the system.

In accordance with a preferred embodiment of the present invention, I have shown and described a novel adjusting mechanism for a taking lens system of a camera including at least one axially movable lens component for varying the magnification of the system. The mechanism includes a linearly movable slide and a lever pivotally mounted between its ends. One of the ends of the lever is connected to the movable lens component and the other end is connected to the slide by a flexible member.

More specifically, the illustrated embodiment of the present invention includes a generally circular cam surface having first and second sections rotatable in either direction through a full 360°. A cam follower interconnects the cam surface and the movable lens component or components so that the components are moved in first and second opposite directions when the cam follower is on the first section and the cam surface is rotated in first and second angular directions, respectively, and so that the components are moved in second and first opposite directions when the follower is on the second section and the cam surface is rotated in the first and second angular directions, respectively.

By inspection of the herein described embodiment of the present invention it will become apparent that I have provided a unitary mechanism, which may be formed in a single operation such as by molding, for transmitting rotational movement of a cam surface on a zoom control knob to linear movement of zoom portions of an optical system.

The invention, and its objects and advantages will become more apparent in the detailed description of the preferred embodiment presented below.

BRIEF DESCRIPTION OF THE DRAWINGS

In the detailed description of the preferred embodiment of the invention presented below, reference is made to the accompanying drawings in which:

FIG. 1 is a partially exploded perspective view of a mechanism according to the present invention for zooming an objective;

FIG. 2 is a side elevation view of a portion of the zooming mechanism shown in FIG. 1; and FIG. 3 is an elevation of the portion of the zooming mechanism shown in FIG. 2 in another position.

DESCRIPTION OF THE PREFERRED EMBODIMENT

Because cameras are well known, the present description will be directed in particular to elements forming part of, or cooperating more directly with, apparatus in accordance with the present invention. It is to be understood that camera elements not specifically shown or described may take various forms well known to those skilled in the art.

Referring to FIG. 1, an optical system according to the illustrated preferred embodiment of the present invention for a motion picture camera includes a zooming portion which comprises a first lens component 10 which is positive and is movably mounted for focusing. The zoom portion further includes a zooming component 12 and a compensating component 14. Components 12 and 14 are moved in opposite directions for varying the magnification of the system by means of a mechanism to be described hereinafter. A relay objective 16 is provided behind the zooming portion.

FIG. 1 also shows a simple, low cost, zoom mechanism adaptable to work with a linear opposed motion zoom system such as the one shown. Components 10, 12 and 14 are held by lens mounts 18, 20 and 22, respectively. Lens mount 18 is axially movable in the camera and carries three slide rods 24, 26 and 28. Rotation of an adjusting ring 19 moves mount 18 to adjust the camera focus. Sleeve members 30 and 32 rigidly attached to lens mounts 20 and 22, respectively, are slidable along rods 26 and 28. Zooming and compensating components 12 and 14, respectively, are kept in axial alignment by two yokes (not shown) which are allowed to travel along slide rod 24. Two pins 34 and 36 positioned on sleeves 30 and 32, respectively, are inserted into slots in the ends of a linking lever 38. Linking lever 38 is pivotable on a pin 40 rotatably carried by a part of a camera casing 42.

A second pin 44 on sleeve member 32 is inserted in a slot in the end of a lever 46 which is pivotable on a pin 47 rotatably carried by a part of the camera casing 42. Lever 46 has a thin resilient finger member 48 integrally formed therewith which engages a fixed part 50 (FIGS. 2 and 3) of the camera casing. Member 48 is normally deflected by casing part 50 and reacts against that part to bias lever 46 in a clockwise rotational direction about pin 47.

The lower end of lever 46 is connected by a thin, flexible necked region or member 52 to a slide portion 54. Portion 54 is restricted to linear motion by a pair of pins 56 and 58 fixed on the camera housing cooperating with a slot in slide portion 54. Necked portion 52 permits relative rotational movement between slide portion 54 and lever 46. In the preferred embodiment, lever 46, resilient member 48, necked region 52, and slide 54 are formed of a single, integral, molded part, thereby reducing manufacturing and assembly costs.

A zoom control knob 60 is operatively connected to slide portion 54 by a double-cam member 62. Referring to FIGS. 2 and 3, the zoom mechanism is shown in its maximum wide angle and telephotopositions, respectively. In FIG. 2, zoom control knob 60 has been rotated until slide portion 54 has entered a detent 64 at the "lowest" region of cam member 62. Resilient portion 48 has caused lever 46 to rotate in a clockwise direction about pivot pin 44, pushing slide portion 54 leftwardly into detent 64.

As control knob 60 is turned in either direction, slide portion 54 rides out of detent 64 and up the ramp surface of cam member 62, thereby moving lever 46 against the force exerted by resilient portion 48 in a counterclockwise direction about pivot pin 44. This moves sleeve 32 to the left between the positions shown in FIGS. 2 and 3, respectively. This pivots linking lever 38 about pivot pin 40 in a clockwise direction, thereby moving components 12 and 14 in opposite directions away from each other. When the system has reached its maximum telephotoposition, slide portion 54 falls into another detent 66 in cam member 62 thereby indicating to the operator that he has reached maximum telephoto. This position is shown in FIG. 3. From this position, rotation of control knob 60 in either direction will move slide portion 54 to the left as shown in FIG. 3, thereby moving components 12 and 14 closer together.

The invention has been described in detail with particular reference to preferred embodiments thereof, but it will be understood that variations and modifications can be effected within the spirit and scope of the invention.

I claim:

1. An adjusting mechanism for a camera taking lens system including at least one axially movable component for varying the magnification of the system, said mechanism comprising:
   a first member rigidly connected to the component and movable therewith;
   a linearly movable slide;
   a lever;
   means for connecting said lever to said first member in a manner permitting relative rotational and linear movement therebetween;
   a flexible member interconnecting said lever to said slide; and
   means for pivotally mounting said lever in the camera for rotation about an axis intermediate the lever connections to said slide and said first member, whereby linear movement of said slide is transmitted into rotational movement of said lever and linear movement of said first member and component.

2. An adjusting mechanism as defined in claim 1 further comprising a cam surface drivenly connected to said slide and rotatable through a full 360°, said cam surface having first and second sections shaped to move said slide in first and second opposite directions when said slide is drivenly connected to said first section and said cam surface is rotated in first and second angular directions, respectively, and to move said slide in said second and first opposite directions when said slide is drivenly connected to said second section and said cam surface is rotated in said first and second angular directions, respectively.

3. An adjusting mechanism as defined in claim 2 wherein said cam surface includes detent means for providing a sensory indication when said slide is positioned at its maximum displacement in either of said opposite directions.

4. An adjusting mechanism for a taking lens system of a camera including a housing and at least one axially movable component for varying the magnification of the system, said mechanism comprising:
   a movable cam surface;
   a linearly movable slide contacting said cam surface for movement thereby;
   a lever;
   means interconnecting said slide and said lever;
   means interconnecting the component and said lever;
   means constraining said lever to rotational movement about an axis intermediate the lever connections to said slide and said component; and
   a resilient member integrally formed with said lever and abutting the camera housing whereby said lever is biased for rotation about said axis in a direction urging said slide toward said cam surface.

5. An adjusting mechanism as defined in claim 4 wherein said slide, said lever, said resilient member, and said means interconnecting said slide and said lever comprise a single, integral molded part.

6. An adjusting mechanism as defined in claim 4 wherein said cam surface is rotatable through a full 360°, said cam surface having first and second sections shaped to move said slide in first and second opposite directions when said slide is in contact with said first section and said cam surface is rotated in first and second angular directions, respectively, and to move said slide in said second and first opposite directions when said slide is in contact with said second section and said cam surface is rotated in said first and second angular directions, respectively.

7. An adjusting mechanism as defined in claim 6 wherein said cam surface includes detent means for providing a sensory indication when said slide is positioned at its maximum displacement in either of said opposite directions.

8. In a camera having a housing, a lens system with at least one adjustable component, and means mounting the adjustable component for movement through a range of positions, the improvement comprising:
   a cam surface;
   means mounting said cam surface for movement through a range of positions;
   coupling means for effecting adjustment of said adjustable component in response to movement of said cam surface, said coupling mean comprising (a) a cam follower portion engageable with said cam surface and movable in response to movement of said cam surface, (b) a lever portion coupled to said adjustable component, and (c) a flexible connecting portion interconnecting said cam follower portion and said lever portion;
   means carried by the camera housing for constraining said cam follower portion of said coupling means to linear, reciprocating motion in response to the movement of said cam surface;
   means carried by said camera housing constraining said lever portion of said coupling means to pivotal movement; and
   means biasing said cam follower portion of said coupling means toward said cam surface.

9. The improvement as defined in claim 8 wherein said biasing means comprises a flexible, resilient finger portion of said coupling means, said finger portion being in engagement with said housing for reacting from the housing in a direction to bias said cam follower portion of the coupling means toward said cam surface.

* * * * *